Patented Mar. 23, 1943

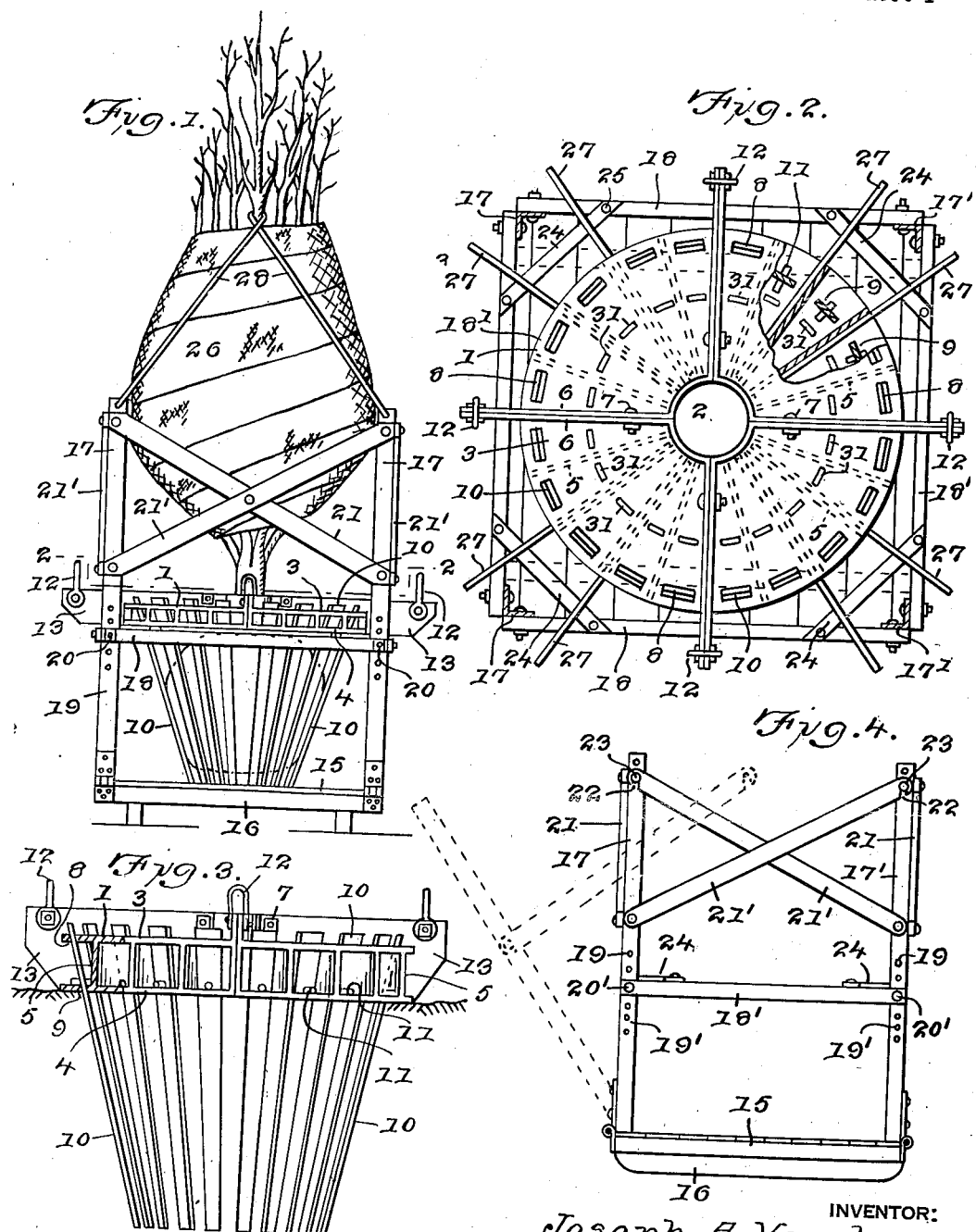

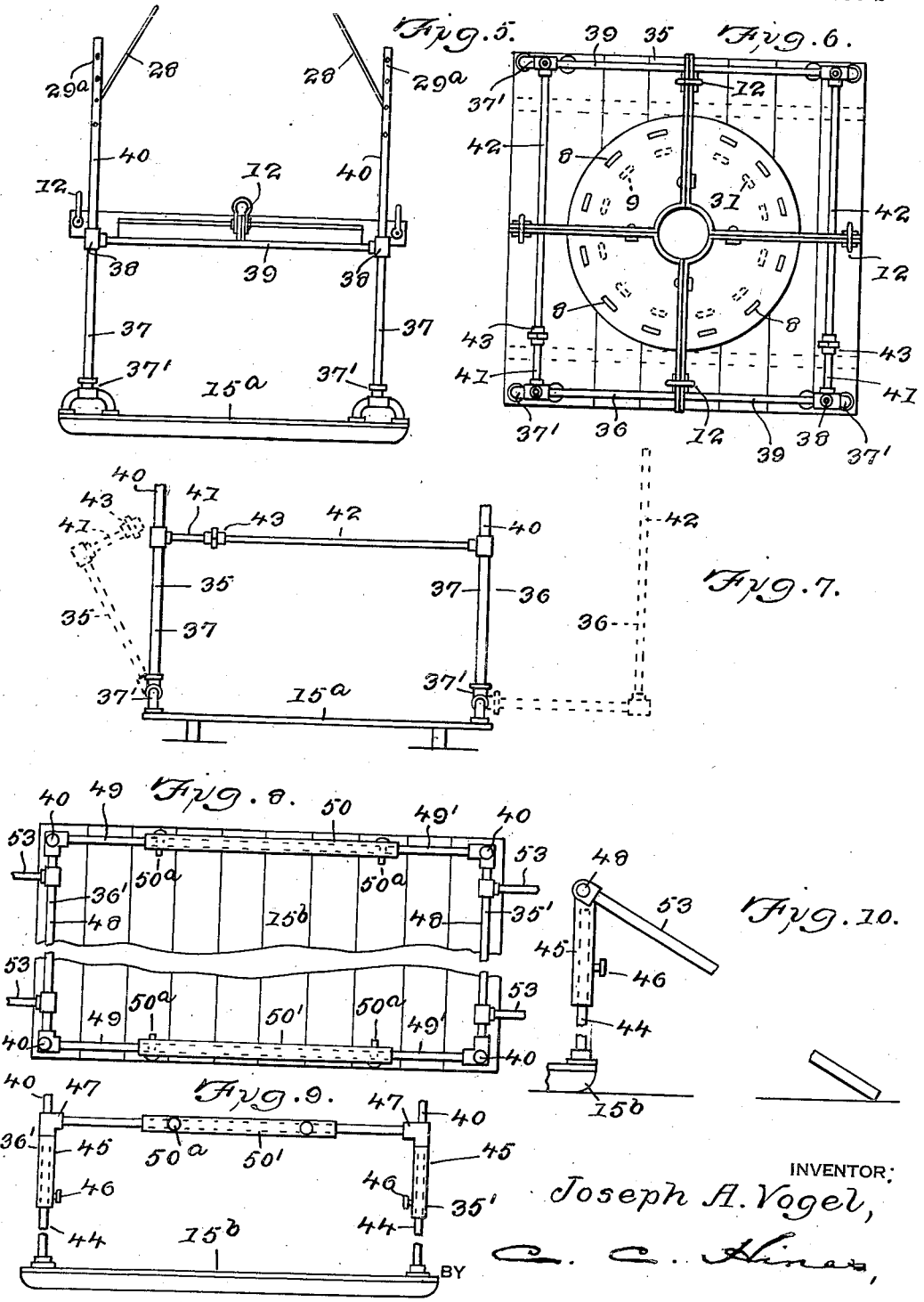

2,314,567

UNITED STATES PATENT OFFICE 2,314,567

TREE REMOVING AND SUPPORTING APPARATUS

Joseph A. Vogel, Wilmington, Del.

Original application April 29, 1941, Serial No. 391,005. Divided and this application May 27, 1942, Serial No. 444,709

14 Claims. (Cl. 47—37)

This application is a division of my prior application, Serial No. 391,005, filed April 29, 1941.

This invention relates to improvements in apparatus for use in extracting trees and the like from the ground, supporting the removed tree while being released from the extracting means and while its root ball is being wrapped, transporting the tree if desired by the supporting means to a truck or other vehicle, transplanting the tree, and preparing a hole in the ground for the reception of a tree which is being transplanted.

One object of the invention is to provide a novel and improved digger or extractor for separating the roots of a tree with surrounding earth from the ground in a ready, convenient and expeditious manner, and a support for holding the tree in position during removal of the digger or extractor therefrom, so that trees of even large size may be removed and prepared for shipment and transplanting without injury to the tree.

Another object of the invention is to provide novel and improved supporting means whereby the roots of the tree and surrounding earth withdrawn therewith may be readily wrapped while the digger and tree are supported to protect the root ball, and whereby the tree may be separated from the digger for shipment and transplanting, without injury to the digger or to the roots of the tree and without liability of breaking the root ball.

Still another object of the invention is to provide a supporting device which may be used to support the tree and digger or extractor while the digger and extractor device is being detached from the removed tree in such manner as to prevent injury to the root ball and so as to allow a protective wrapping to be conveniently applied thereto, and whereby after the root ball has been wrapped the tree if desired may be moved from the removal site to a truck or other transport vehicle.

Still another object of the invention is to provide a sectional digger or extractor and supporting device having cooperating supporting surfaces whereby reception and release of the tree to be wrapped and transported is facilitated while protection to the tree is afforded.

With these and other objects in view, the invention consists of the features of construction, combination and arrangement of parts, hereinafter fully described and claimed, reference being had to the accompanying drawings, in which:

Fig. 1 is a view in elevation of a digger or extractor and digger supporting and releasing device embodying my invention, showing a tree in position for removal.

Fig. 2 is a sectional plan view on line 2—2 of Fig. 1.

Fig. 3 is a side elevation, partly in vertical section, of the digger or extractor removed from the supporting device and as arranged for use in extracting a tree.

Fig. 4 is a view in elevation of the supporting device looking toward a side thereof at right angles to that shown in Fig. 2.

Figs. 5, 6 and 7 are views similar to Figs. 1, 2 and 4 of a modified form of the supporting device.

Figs. 8 and 9 are respectively a fragmentary plan view partly broken away and a view in side elevation of still another modified form of the supporting device.

Fig. 10 is a fragmentary side elevation of the supporting device shown in Figs. 8 and 9 looking toward a side at right angles to that shown in Fig. 8.

In my aforesaid prior application, Serial No. 391,005, I have directed the claims to the novel features of construction of my improved digger or extractor per se, while in this divisional application I have directed the claims to the novel features of construction of the supporting device per se and to the novel combination of features of the digger or extractor and the supporting device whereby they are adapted to coact with each other to support the tree while the root ball is being formed and the tree prepared for shipment and while the digger or extractor is being removed to free the tree therefrom. In order that these cooperative coactions may be fully understood I have herein shown and described both devices and the manner in which they are employed for extracting and supporting actions. To this end I have shown herein some of the forms of the diggers or extractors shown in my said application Serial No. 391,005, although it is to be understood that any of the forms of diggers or extractors shown in said application may be employed, or any other suitable form and construction of digger or extractor.

In carrying my invention into practice in the form of digger or extractor shown in Figs. 1 to 5, inclusive, I provide a plate-like tree digger or extractor comprising a lifting head 1 of circular form and having a central opening 2. This head is preferably formed of a pair of similar upper and lower plate members 3 and 4 which are suitably spaced from each other. Each of these plates is divided radially at angles of 90° to form the plate into quadrants or quarter sections or segments, the similar quadrants or sections of each plate being rigidly united by radially arranged ribs 5 which are welded to the plate sections. The head as thus constructed is composed of double plate sections adapted to be nested or fitted together to form the circular lifting plate. The plates are also provided along their meeting edges with ribs 6 which extend upwardly and downwardly above and below the upper and lower faces of the respective plates and are apertured for the passage of bolts 7 whereby the sections of the head are adapted to be fastened in assembled condition.

The head 1 is adapted to be disposed on the ground so as to encircle the trunk or stem of the tree which is to be extracted, the opening 2 being provided for the passage of said trunk or stem upwardly through the head. The sectional construction of the head adapts it when its sections are disconnected to be fitted in position on the ground about the tree stem or trunk, after which its sections are bolted together to hold them assembled for the extracting action. The described construction of the head provides a head which is extremely strong and rigid and may be made of large dimensions for the extraction and lifting of even large trees without danger of the head bending or buckling.

The upper plate 3 of the head is provided adjacent to its periphery with an annular series of slots 8, while the lower plate 4 is provided with an annular series of similar slots 9, the slots 9 in the plate 4 being arranged somewhat closer to the opening 2 or axial center of the head than the slots 8. The slots 8 and 9 are disposed in properly spaced relation about the plates between the reinforcing ribs and form guides for the reception and downward passage of the ground breaking or piercing blades or members 10. After the lifting head plates have been assembled upon the ground about the tree the ground breaking or piercing members 10 are driven downwardly through the sets of coacting slots 8 and 9 in the plates 3 and 4 so as to enter the earth about the roots of the tree to a proper depth below the surface. After these ground breaking or piercing members 10 are driven downwardly, retaining pins 11 or the like are passed through openings therein so that they may bear upon the plate 4 to support and hold said ground breaking or piercing members against further downward movement or displacement. The slots 8 and 9 are so arranged as to guide the members 10 at an inward and downward angle into the ground so that said members will be arranged to form an inverted frusto-conical basket enclosing and separating from the ground the roots and the earth in which the roots are embodied to form the earth or root ball. The pins 11 hold the members 10 from displacement in the subsequent operation of lifting the tree trunk or stem and formed root ball from the ground. Since the plates 3 and 4 support and guide the blades at spaced points pivotal movements of the blades are prevented while they are being driven and the blades are firmly braced against movement out of position or liability of being broken.

In order to adapt the lifting head and the severed tree to be conveniently removed from the ground, clevices, lifting links or like fittings 12 may be secured to the flanges 6 by their attaching bolts 7, so that a hoisting boom or hoisting gear of any suitable type may be applied to the lifting head for the lifting action. I also preferably provide the flanges 6 with extensions 13 projecting beyond the periphery of the lifting head and serving as arms to which the hoisting gear or steadying ropes or cables may be attached, and which also serve to support the head within a supporting device during the operation of wrapping the root ball and removing the lifting head after the tree has been lifted out of the ground.

While the lifting head is preferably formed, as above described, of four sections and of upper and lower plates the similar sections of which are rigidly united in the manner described, I may, particularly where the head is of small size, construct it of a lesser number of sections, that is, of either two sections or three sections, and under some conditions I may also construct the lifting head of a single plate instead of a pair of superposed plates, and I may employ other forms of ground breaking or piercing elements in place of the blades 10, as disclosed in my aforesaid application Serial No. 391,005.

In any of the forms of diggers and extractors above described there may be provided openings 31 for the passage of cutter blades 32 at an inward and downward angle to cut away the excess earth at the upper portion or corners of the root ball.

I will now describe the supporting device provided for use with the digger or extractor whereby the lifting head and extracted tree may be supported to allow the root ball to be wrapped with a protective covering and the lifting head to be moved and the tree subsequently transported if desired to a new site or to a transport vehicle without liability of injury to the tree root or loss of the ball of earth about the same.

This supporting and transporting device, as shown in Figs. 13, 14 and 15, comprises a rectangular platform 15 mounted on base supports 16. Hinged at their lower ends to the corners of the platform to swing outwardly and downwardly and upwardly and inwardly at such sides of the platform are pairs of angle metal corner posts or uprights 17, 17'. The posts 17, 17' of each pair are adapted to be permanently connected by tie bars 18, secured to the posts at a suitable height above the platform 15 and below the upper ends of the posts. To enable this height to be varied within determined limits the posts are provided each with a series of spaced openings 19 for the reception of bolts 20 which are also passed through the bars 18 to adjustably secure the bars 18 in position at the proper level above the platform. The posts 17 and 17' of each pair are also connected and braced above the bars 18 by stay bars 21 arranged in crossing rotation or X-fashion and bolted or riveted to each other at the crossing point and bolted or riveted at their ends to the posts. The posts 17 or 17' of each pair are thus connected to swing outwardly or inwardly in unison and as a frame side or unit. At the two remaining diametrically opposite sides, at right angles to those first-named, tie bars 18', similar to the tie bars 18, are provided to connect the posts 17, 17' at these sides. Each of these bars 18' is perforated at its ends for passage of bolts 20' engageable with rows of openings 19' in said posts to hold the frame sides or units in upright, frame-forming position. The bars 18', like the bars 18, are adjustable and may be secured in position at a proper level above the platform 15. In practice the bars 18, 18' are preferably secured to the posts at the same level in order that they may form supports for the digger or extractor on which the arms 13 of the digger or extractor may rest. Also at the respective sides of the frame at which the bars 18' are located are arranged pairs of stay bars 21 for connecting and bracing the posts above the cross bars 18'. The bars 21' of each pair, like the bars 21, are disposed in crossing relation or X-fashion but each bar 21 is pivoted at its lower end to one of the posts at its side of the frame and provided at its free end with a hook or slot 22 to engage a headed fastening pin or stud 23 on the opposite post at the same side of the frame. When the bars 18' and 21' are so applied and engaged with the elevated corner posts the frame will be held in tree enclosing position and the swinging frame sides or units against outward swinging movements. When the bolts 20' and hooked ends of bars 21' are released, however, the hinged frame sides or units may be swung outwardly to open the frame for insertion or removal of the tree in if it is desired to insert or remove the tree in this manner. Diagonal stay bars 24 may be used and extended across the tie bars at the corners of the frame thus formed and secured to the tie bars by bolts or pins 25. The posts and bars form an enclosing frame into which the digger and extractor enclosing the root ball of the extracted tree may be moved by the hoisting means until the lower ends of the piercing members 10 are brought to rest upon the platform 15 and the arms 13 of the supporting head are brought to rest upon the tie bars 18, 18', whereby the weight of the tree and lifting head will be supported and removed from the root ball and injury to the roots and loosening of the surrounding earth prevented.

Prior to the operation of lowering the extracted tree onto the platform 15 a wrapping 26 of burlap or other suitable material is laid on the platform so that it will be in position to be wrapped about the root ball when the digger or extractor is released therefrom. Also prior to the release of the digger or extractor, brace bars or weight sustaining bars 27 are preferably rested on the braces and extended into the spaces between the plates of the lifting head sections, as shown in Fig. 2, to sustain the weight of the lifting head sections and guide them as they are being released. To release the digger or extractor the fastening bolts 7 which unite its sections are removed and the lifting head sections with their attached piercing members 10 shifted over the bars 18, 18' toward the sides of the frame, after which the piercing members 10 and lifting head sections may be readily lifted out and removed, thus freeing and exposing the tree roots and earth. The tree may then be lowered onto the platform and the wrapper 26 then applied and secured about the root ball to hold the same intact and prevent injury thereto during further handling of the tree. To steady the tree and assist in supporting it while being lowered into the frame and held therein and wrapped, suitable stays 28 engaged with openings 29 in the posts may be fastened to the tree for the purpose. The burlapped tree may then be released from the supporting device by opening up the frame thereof in an obvious manner and then lifting the tree onto a transport truck or other vehicle or the frame may be left in a set up condition and the tree transported therein and thereby to a transport truck or vehicle on which it is to be loaded and shipped to a transport point. If the supporting device is intended to be used also for transporting the tree to a nearby car or vehicle the base supports 16 may be in the form of skids or sled runners.

In Figs. 5, 6 and 7 I have shown a modified form of supporting device which is largely constructed of tubing or piping. This comprises a platform base 15a and frame members 35 and 36 of generally similar construction and adapted to be swung upwardly and connected to enclose the root ball of the tree and adapted to be disconnected and swung outwardly to release the tree. As shown, each frame member comprises a pair of corner posts or tubes 37 hinged at their lower ends, as at 37', to the platform and provided at their upper ends with four-way fittings or couplings 38. These posts of each frame member are connected and braced by a cross tube or arm 39 connected with the fittings. The fittings also provide for the connection with the posts of tubes 40 forming upward extensions thereof to guide the tree in position and which may be provided with apertures 29a for the attachment thereto of the tree stays 28. To the posts of one of the frame members, as the frame member 35, are attached, by the coupling 38, tubes 41, and the posts of the other frame member 36 are similarly attached arms or tubes 42, which are arranged on the inner sides of said frame members, at right angles thereto, and so as to extend toward each other when the frame members are in an upright position. These arms form coupling arms to connect the frame members 35 and 36 and serve also to form the sides of the frame at right angles to the sides formed by said frame members. These arms 41 and 42 are adapted to be united by suitable rotatable and threaded couplings 43 to hold the frame members united or set up to form the enclosing frame. When the frame is set up the lifting head may be lowered thereinto and rested by its supporting members on the tubes or arms 39 and the connected arms or tubes 41, 42. If a sectional head is used the head sections when uncoupled may be slid outwardly on the arms to open the head for release of the tree. Fig. 7 shows in dotted lines the manner in which the sides 35 and 36 are swung outward to open up the support for the spreading of the root ball wrapper on the platform and to allow more ready removal of the head, excess earth and wrapped tree. The coupling arms 41 of one of the frame sides, as the arms of the frame side 35, may be made shorter than the coupling arms 42 of the other frame side, to facilitate these actions.

Figs. 8, 9 and 10 show another construction of the support which comprises a platform base 15b having corner rods or tubes 44 fixed to the platform and supporting vertically adjustable frame sides 35' and 36'. Each of these frame sides consists of a pair of corner tubes or posts 45 telescoping over a pair of the rods 44 and adapted to be adjustably secured thereto by screws or fastening pins 46, a four-way coupling 47 at the upper end of each corner tube, and a cross rod or tube 48 secured to the couplings of and connecting the pair of corner tubes of said frame side. Also secured to the couplings of the respective frame sides 35' and 36' are tubes or rods 49, 49' which extend inwardly therefrom and telescope within tubular coupling sleeves 50, 50' which connect the opposed corner posts of the side frames 35', 36' together and form with said posts the frame sides at right angles to said sides 35', 36'. Suitable fastenings 50a may be provided to secure the tubes 49, 49' and sleeves 50, 50' together. This construction provides a rectangular supporting frame which may be adjusted to suit different heights of trees and which comprises parts which may be lifted off the base support and uncoupled for ready transportation and handling and coupled together for use. Extension rods or pipes 40 similar to those shown in Figs. 5, 6 and 7 may be applied to the couplings 47 to increase the height of the frame and to serve as guides and stays for the tree. The set up frame is designed to be used as a support for the lifting head and to allow removal of the head from the tree in the same manner as that described in connection with the supports previously described. To the cross tubes or rods 48 of each frame side 35', 36', may be pivoted, as by sleeves 52, a pair of rods 53 which are slidably adjustable toward and from each other to vary the distance between them. These rods may be swung inwardly over upon the frame to dispose them in an out of the way position for convenience in conveying the support from place to place, and the rods may be swung outwardly to the inclined position shown in Fig. 10 to serve as a slideway down which a lifting head being removed from the frame may be slid with facility.

It will be observed that the supporting arms of the digger and supporting surfaces of the supporting device on which they rest not only provide for the support of the lifting head and tree while the wrapping is being applied, but also for the support of the lifting head while it is being removed from the tree, so that during these operations the weight of the head is wholly removed from the tree to prevent the root ball from being crushed or in any manner injured. The construction and arrangement of these arms and surfaces is also preferably such as to allow the lower ends of the piercing blades to rest on the platform 15 while the tree is being supported and so as to relieve such blades from the weight of the lifting head or tree or other supporting strain.

From the foregoing description, taken in connection with the drawings, the construction and mode of use of my improved tree removing and transplanting apparatus will be readily understood, and it will be seen that the invention provides a tree excavating and lifting device and coacting supporting means whereby a tree may be readily excavated with a proper amount of earth about its roots and then lifted out of the ground and supported while the excavator and lifter is being removed and a wrapping is being applied without injury to the roots or breakage of and loss of the earth surrounding its roots, so that the tree may be raised and readily put in best condition for shipment and transplanting. Also it will be seen that the invention provides an excavator and lifter which may be readily and conveniently applied for use in excavating and lifting a tree and removed to release the tree and which may be made of large size and great strength for use in excavating and lifting trees of large size. Furthermore, it will be seen that the invention provides a novel and efficient construction of supporting and transporting device by which the weight of the excavator and lifter and the tree may be sustained to prevent injury to the tree during the process of removing the excavator and lifter, and also by which the tree may be transported from the removal site to a transport vehicle for shipment.

While the constructions disclosed for these purposes are preferred, it will be understood that changes in the arrangement, construction and form of the parts may be made within the scope of the appended claims, without departing from the spirit or sacrificing any of the advantages of the invention.

What I claim is:

1. In a tree transplanting apparatus, the combination of an excavator and lifter for separating the roots of a tree with surrounding earth from the ground, said excavator and lifter adapted to be applied about the tree for use and removed from the tree after use, and a supporting means adapted to enclose the base of the tree and the excavator and lifter, said excavator and lifter and supporting means having coacting surfaces to support the weight of the excavator and lifter during its removal from the tree.

2. In a tree transplanting apparatus, the combination of an excavator and lifter for separating the roots of a tree with surrounding earth from the ground, said excavator and lifter comprising a head adapted to be applied about the tree for use and shiftable horizontally from about the tree after use, and a supporting means adapted to receive and enclose the base of the tree and the excavator and lifter and to support the weight of the latter during its removal from the tree, said supporting means comprising a platform and a supporting surface carried by and arranged above the level of the platform for supporting and adapting the head to be slid over the same and moved away from the tree in the separating action.

3. In a tree transplanter, an excavating and lifting device adapted to be placed about the tree for an excavating and lifting action and to be thereafter removed from about the tree, said device comprising radially separable sections, and a supporting and transporting device adapted to receive and enclose the base of the excavated tree and the excavating and lifting device and support the weight of the tree and the excavating and lifting device during the removal of the latter from the tree, said supporting and transporting device comprising a platform, and a frame extending upwardly from said platform to enclose the tree and including members arranged above the level of the platform and adapted to support the sections of the excavating and lifting device and guide them outwardly in their radial separating action.

4. In a tree transplanter, an excavating and lifting device adapted to be placed about the tree for an excavating and lifting action and to be thereafter removed from about the tree, said device comprising radially separable sections having supporting arms extending outwardly from their peripheries, and a supporting and transporting device adapted to receive the base of the excavated tree and support the weight of the tree and the excavating and lifting device during the removal of the latter from the tree, said supporting and transporting device comprising a platform, and a frame extending upwardly from said platform to enclose the tree and including members arranged above the level of the platform and on which said supporting arms of the sections of the excavating and lifting device are adapted to rest to support said device and guide said sections outwardly in their radial separating movement.

5. In a tree transplanter, an excavating and lifting device adapted to be placed about the tree for an excavating and lifting action and to be thereafter removed from about the tree, said device comprising radially separable sections, and a supporting and transporting device adapted to receive the base of the excavated tree and support the weight of the tree and the excavating and lifting device during the removal of the latter from the tree, said supporting and transporting device comprising a platform, uprights hinged at their lower ends to the corners of the platform, and tie members for connecting said uprights above the level of the platform to adapt the same to form a frame to enclose the tree and to serve as supports to sustain the weight of the tree and excavating and lifting device on which the sections of said device may be moved radially outward in releasing said excavating and lifting device from the tree.

6. In a tree transplanter, an excavating and lifting device adapted to be placed about the tree for an excavating and lifting action and to be thereafter removed from about the tree, said device comprising radially separable sections, and a supporting and transporting device adapted to receive the base of the excavated tree and support the weight of the tree and the excavating and lifting device during the removal of the latter from the tree, said supporting and transporting device comprising a platform, uprights hinged at their lower ends to the corners of the frame, tie members for connecting the uprights above the level of the platform to form therewith a frame to receive the excavated tree and excavating and lifting device and support the weight of the latter and guide the sections thereof outwardly in their radial separating action, and braces hinged at one end to the uprights at each side of the frame above the tie members and adapted to be arranged in crossed relation and interlocked at their opposite ends with the uprights.

7. In a tree transplanter, a supporting device for use with an excavating and lifting head adapted to be placed about the tree for an excavating and lifting action and to be thereafter removed from about the tree, said supporting device being adapted to receive and enclose the base of the excavated tree and the head and to support the weight of the tree and the head during the removal of the latter from the tree and comprising a base, uprights carried by the base and forming therewith a frame to receive the excavated tree and excavating and lifting device, and means carried by the uprights to support the head at a level above the level of the base.

8. In a tree transplanter, a supporting device for use with an excavating and lifting head adapted to be placed about the tree for an excavating and lifting action and to be thereafter shifted horizontally from about the tree, said device comprising a platform and upright members carried thereby and cooperating therewith to form a frame to receive and enclose the excavated tree and excavating and lifting device and support the weight of the latter, at least one of said members being mounted to swing from a frame forming position.

9. In a tree transplanting apparatus, a supporting device for use with a tree excavating and lifting head adapted to be coupled about a tree for excavating and lifting the tree from the ground and to be thereafter uncoupled and removed from about the tree, said supporting and transporting device comprising a platform, uprights pivoted to the platform so as to be swung into and out of a cage forming position, said cage being adapted to receive the base of the tree and excavating and lifting device, and members for connecting and holding the uprights in cage forming position and adapted to support the excavating and lifting device above the platform and while they are being uncoupled and removed from about the tree.

10. In a tree transplanting apparatus, a supporting device for use with a tree excavating and lifting head adapted to be coupled about a tree for excavating and lifting the tree from the ground and to be thereafter uncoupled and removed from about the tree, said supporting and transporting device comprising a platform, uprights pivoted to the platform so as to be swung into and out of a cage forming position, said cage being adapted to receive the base of the tree and excavating and lifting device, members for connecting and holding the uprights in cage forming position and adapted to support the excavating and lifting device above the platform and while they are being uncoupled and removed from about the tree, and braces for detachably connecting the uprights above the level of said members.

11. In a tree transplanting apparatus, a supporting device for use with an excavating and lifting head constructed so as to be disposed about and removed from about the tree stem, for sustaining the weight of the head and the tree and permitting removal of the head without injury to the tree, said supporting device comprising a platform, frame members carried by the platform movable toward each other to form a cage about the tree and away from each other to open the cage, and supporting members carried by the frame members to support the head sufficiently above the platform to relieve the root ball from the weight of the head and to support th head in the operation of removing it from about the tree.

12. In a tree transplanting apparatus, a supporting device for use with an excavating and lifting head constructed so as to be disposed about and removed from about the tree stem and having outwardly extending supporting members, said supporting device being adapted to sustain the weight of the head and the tree and permit removal of the head without injury to the tree and comprising a platform, frame members carried by the platform movable toward each other to form a cage about the tree and away from each other to open the cage, and supporting members carried by the frame members and adapted to be engaged by the supporting members on the head to hold the head sufficiently elevated above the platform to relieve the root ball from the weight of the head and to support the head in the operation of removing it from about the tree.

13. In a tree transplanting apparatus, the combination of an excavator and lifter for separating the roots of a tree with surrounding earth from the ground, said excavator and lifter comprising a head adapted to be applied about the tree for use and shiftable horizontally from about the tree after use, and a supporting means adapted to receive and enclose the base of the tree and the excavator and lifter and to support the weight of the latter during its removal from the tree, said supporting means comprising a platform and surfaces arranged above the level of the platform for supporting the head, the head having outwardly extending projections to rest on said surfaces.

14. In a tree transplanting apparatus, the combination of an excavator and lifter for separating the roots of a tree with surrounding earth from the ground, said excavator and lifter comprising a head adapted to be applied about the tree for use and shiftable horizontally from about the tree after use, and a supporting means adapted to receive and enclose the base of the tree and the excavator and lifter and to support the weight of the latter during its removal from the tree, said supporting means comprising a platform and surfaces arranged above the level of the platform for supporting the head, the head having outwardly extending arms to rest on said surfaces and to slidably engage the same in removing the head.

JOSEPH A. VOGEL.